United States Patent [19]
Kim et al.

[11] Patent Number: 5,438,247
[45] Date of Patent: Aug. 1, 1995

[54] ULTRASONIC SENSOR SCANNING APPARATUS AND METHOD FOR DETECTING OBJECTS BY USE OF THE SCANNING APPARATUS

[75] Inventors: Tae-Sig Kim; Jang-Hyun Yu, both of Suwon, Rep. of Korea

[73] Assignee: Samsung Electronics Co., Ltd., Suwon, Rep. of Korea

[21] Appl. No.: 111,958

[22] Filed: Aug. 26, 1993

[30] Foreign Application Priority Data

Aug. 31, 1992 [KR] Rep. of Korea ............... 1992-15695
May 31, 1993 [KR] Rep. of Korea ............... 1993-9697

[51] Int. Cl.⁶ ..................... G01N 29/26; G01S 15/06
[52] U.S. Cl. ................................. 318/696; 367/104; 73/619
[58] Field of Search ............... 318/599, 685, 696; 73/607, 618, 619, 633, 634; 128/660.01, 660.09; 331/4, 116 R; 367/99, 103, 104, 910

[56] References Cited

U.S. PATENT DOCUMENTS

| | | |
|---|---|---|
| 3,628,375 | 12/1971 | Pagano . |
| 4,092,867 | 6/1978 | Matzuk . |
| 4,275,363 | 6/1981 | Mishiro et al. . |
| 4,280,204 | 7/1981 | Elchinger . |
| 4,880,011 | 11/1989 | Imade et al. . |
| 5,079,752 | 1/1992 | Bloomfield . |
| 5,088,495 | 2/1992 | Miyagawa . |
| 5,152,294 | 10/1992 | Mochizuki et al. . |

Primary Examiner—Bentsu Ro
Attorney, Agent, or Firm—Burns, Doane, Swecker & Mathis

[57] ABSTRACT

An ultrasonic scanning device includes an ultrasonic sensor mounted for rotation. The sensor can be automatically oriented in a predetermined reference position from a random position. During a scanning operation the sensor is rotated by incremental angles. The length of the angles is changed after a predetermined time elapse following the initiation of a scanning operation.

7 Claims, 9 Drawing Sheets

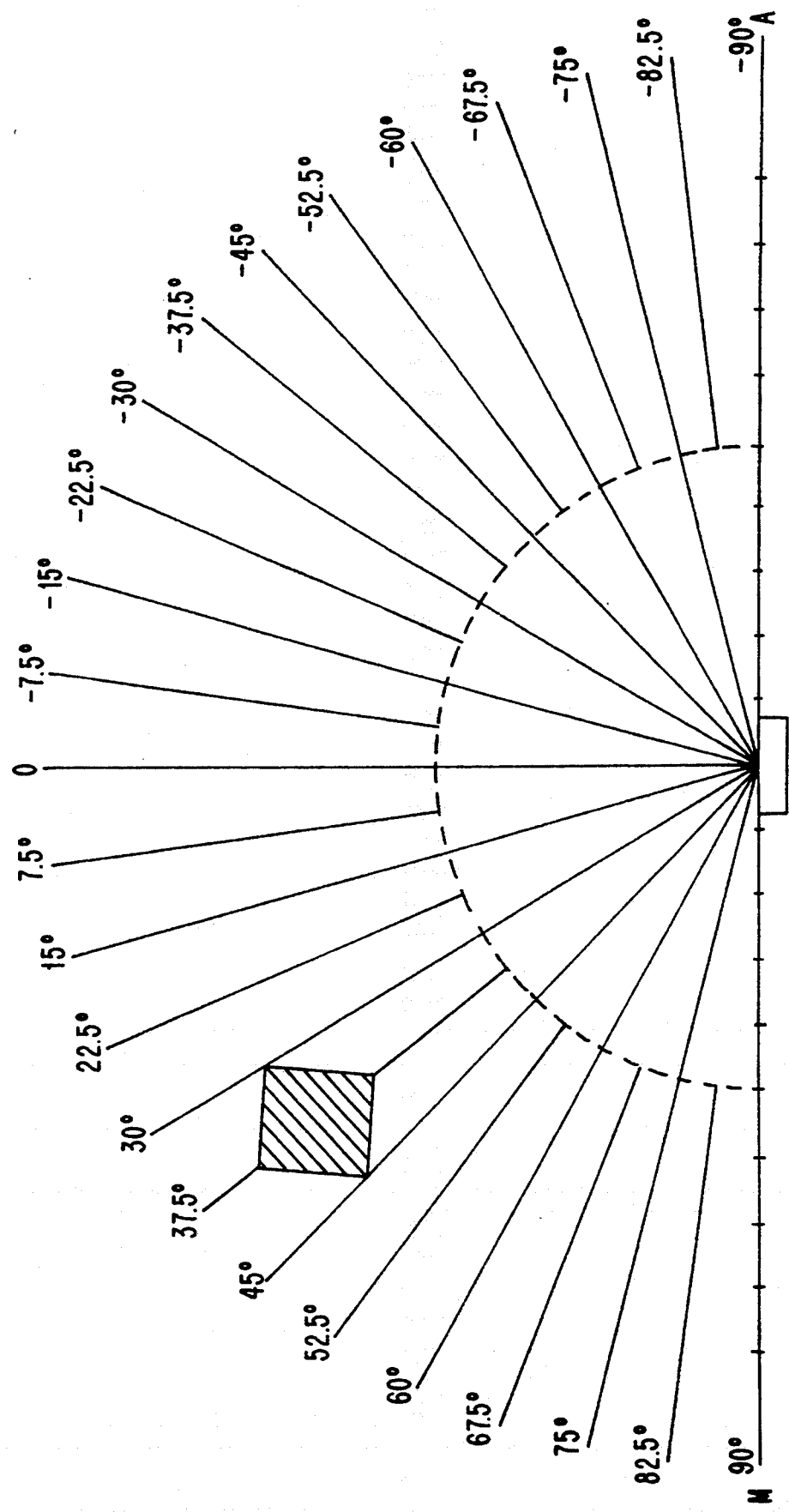

ULTRASONIC SENSOR SCANNING APPARATUS AND METHOD FOR DETECTING OBJECTS BY USE OF THE SCANNING APPARATUS

BACKGROUND OF THE INVENTION

1. Field of the Invention

The present invention relates to an ultrasonic sensor equipped in a robot and adapted to detect objects, and more particularly to a scanning apparatus associated with such an ultrasonic sensor, capable of freely varying a scanning frequency of the ultrasonic sensor and accurately detecting the direction that the ultrasonic sensor is oriented.

Also, the present invention relates to a method for detecting objects by use of an ultrasonic sensor scanning apparatus of the above-mentioned type, capable of accurately detecting all objects positioned in a search area, without a failure.

2. Description of the Prior Art

Generally, ultrasonic sensors are equipped in robots and used For detecting objects positioned along a robot travel path. Such ultrasonic sensors are adapted to convert a pulse signal into an ultrasonic wave energy which is, in turn, radiated at a search area. In the search area, the ultrasonic wave energy strikes and reflected from an object. The reflected ultrasonic wave energy is converted into an echo signal which is, in turn, fed to a microcomputer. The microcomputer records and analyzes the echo signal so that it discriminates the distance between the sensor and the detected object and the property of the object.

However, ultrasonic sensors conventionally used are of the fixed type. Furthermore, they have an object-detecting orientation range of below 30°. For detecting objects arranged in front over a lateral range of 180°, at least 6 ultrasonic sensors have been conventionally used. In other words, conventional object detecting devices are equipped with a plurality of ultrasonic sensors.

In the conventional object detecting devices with the above-mentioned construct ion, the function of detecting objects may be effectively achieved by the ultrasonic sensors. However, there is a disadvantage of an expensive construction due to the use of many ultrasonic sensors. In order to analyze the timing of a pulse signal and a corresponding echo signal reflected from an object, an expensive multiplexor should be also disposed at a path of a signal fed from each ultrasonic sensor. In particular, a larger space for occupying all the elements is required. As a result, it is difficult to design an object detecting device with a compact construction.

For solving these problems, there has been conventionally proposed a scanning device with a rotary type ultrasonic sensor capable of detecting objects arranged in front over a range of 180°. FIG. 1 illustrates such a conventional scanning device. As shown in FIG. 1, the scanning device comprises an ultrasonic sensor 51 and a pair of coil springs 52 arranged above and beneath the ultrasonic sensor 51, respectively, and adapted to apply a return force to the ultrasonic sensor 51. A permanent magnet 53 is mounted the rear portion of ultrasonic sensor 51. At a rear wall 54 disposed in Fear of the permanent magnet 53, a magnet coil 55 is mounted, which is spaced from the permanent magnet 53 and has an offset relationship with the permanent magnet 53. With this construction, the scanning device scans objects by utilizing the return force of the coil springs 52 and electromagnetic force generated between the permanent magnet 53 and the magnet coil 55 while rotating the ultrasonic sensor 51 laterally through an angle of 180°.

In the rotary type scanning device which is constructed to rotate the ultrasonic sensor utilizing a free vibration force of the coil springs, the coil springs may be deformed when a robot carrying the scanning device is inclined as it travels a slope or an irregular floor or rotates sharply. Such a deformation of coil springs causes the offset relationship between the magnet coil and the permanent magnet to be unstable. As a result, the scanning operation can not be performed until the coil springs return to their original states. In particular, the deformation of coil springs may also occur when the scanning device is subjected to an outer impact. Thus, the scanning device encounters a problem that the rotation cycle of ultrasonic sensor varies depending on environmental factors.

Since the ultrasonic sensor of the conventional scanning device operates while changing its linear orientation, its position for transmitting an ultrasonic wave signal does not correspond to its position for receiving an echo signal corresponding to the transmitted ultrasonic wave signal. As a result, there is a problem in detecting objects accurately.

The rotation cycle of ultrasonic sensor may be required to vary depending on its purpose for use. In the conventional scanning device, however, it is difficult to adjust the rotation cycle of ultrasonic sensor, because once the manufacture is completed, the elastic coefficient of the coil springs is fixed.

SUMMARY OF THE INVENTION

Therefore, an object of the invention is to solve the above-mentioned problems encountered in the prior arts and thus to provide an ultrasonic sensor scanning apparatus capable of accurately recognizing the orientation of its ultrasonic sensor and freely varying both the orientation angle and the rotation cycle of the ultrasonic sensor, depending on its purpose for use.

Another object of the invention is to provide an ultrasonic sensor scanning apparatus wherein the orientation of its ultrasonic sensor is detected at every rotation step of a stepping motor, thereby capable of accurately detecting the distance between the sensor and a detected object and the property of the object.

Another object of the invention is to provide a method For detecting objects, capable of achieving an accurate detection by dividing a detection range of an ultrasonic sensor into a short range and a long range, subdividing one step variation range of the ultrasonic sensor upon a detection lb at the long range, and varying parameters for driving the ultrasonic sensor, depending on the detection range, for example, increasing a receiving gain and a transmitting frequency.

In accordance with the present invention, these objects can be accomplished by providing an ultrasonic sensor scanning apparatus comprising: an assembly having a support shaft defining a rotation axis of the ultrasonic sensor and a sensor support die rotatably supported by the support shaft and adapted to support the ultrasonic sensor therein; driving means for generating a driving force for shifting the ultrasonic sensor; and transmission means for transmitting the driving force from the driving means to the ultrasonic sensor.

BRIEF DESCRIPTION OF THE DRAWINGS

Other objects and aspects of the invention will become apparent from the following description of embodiments with reference to the accompanying drawings in which:

FIG. 9 is a schematic view illustrating the detection range of the scanning apparatus according to the present invention.

DETAILED DESCRIPTION OF THE PREFERRED EMBODIMENTS

Figure 1:
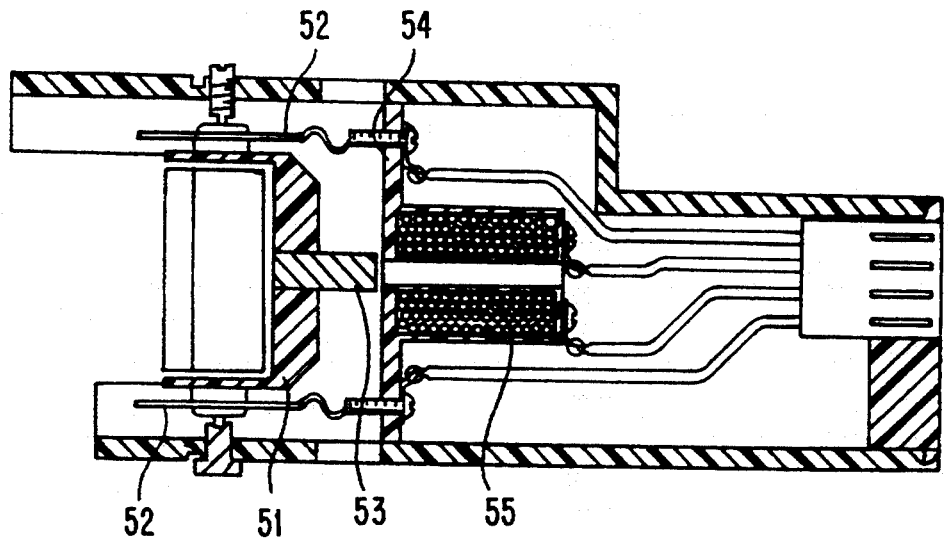
FIG. 1 is a sectional view of a conventional ultrasonic sensor scanning apparatus.
Figure 2:
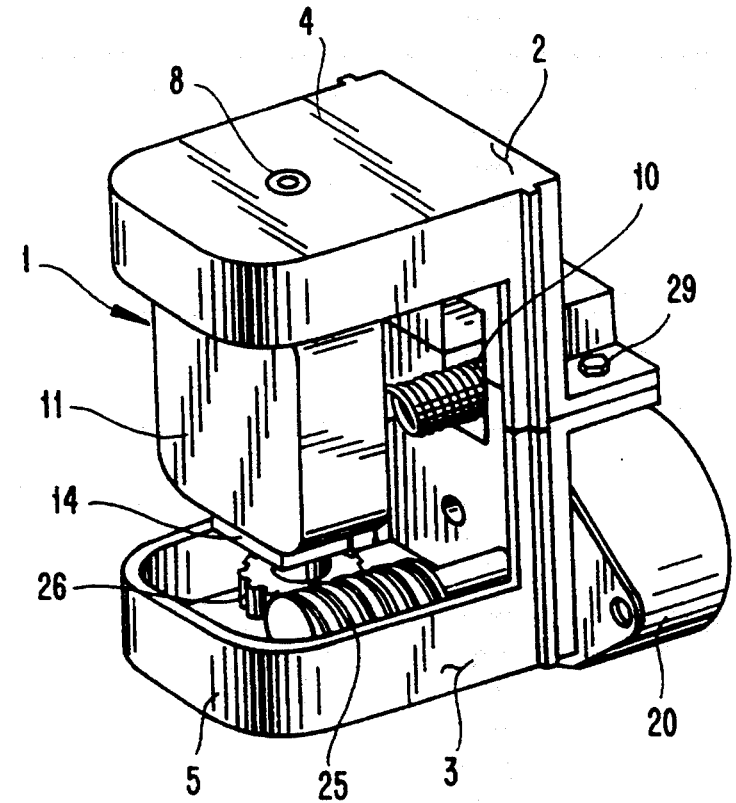
FIG. 2 is a perspective view of an ultrasonic sensor scanning apparatus in accordance with the present invention.
Figure 3:
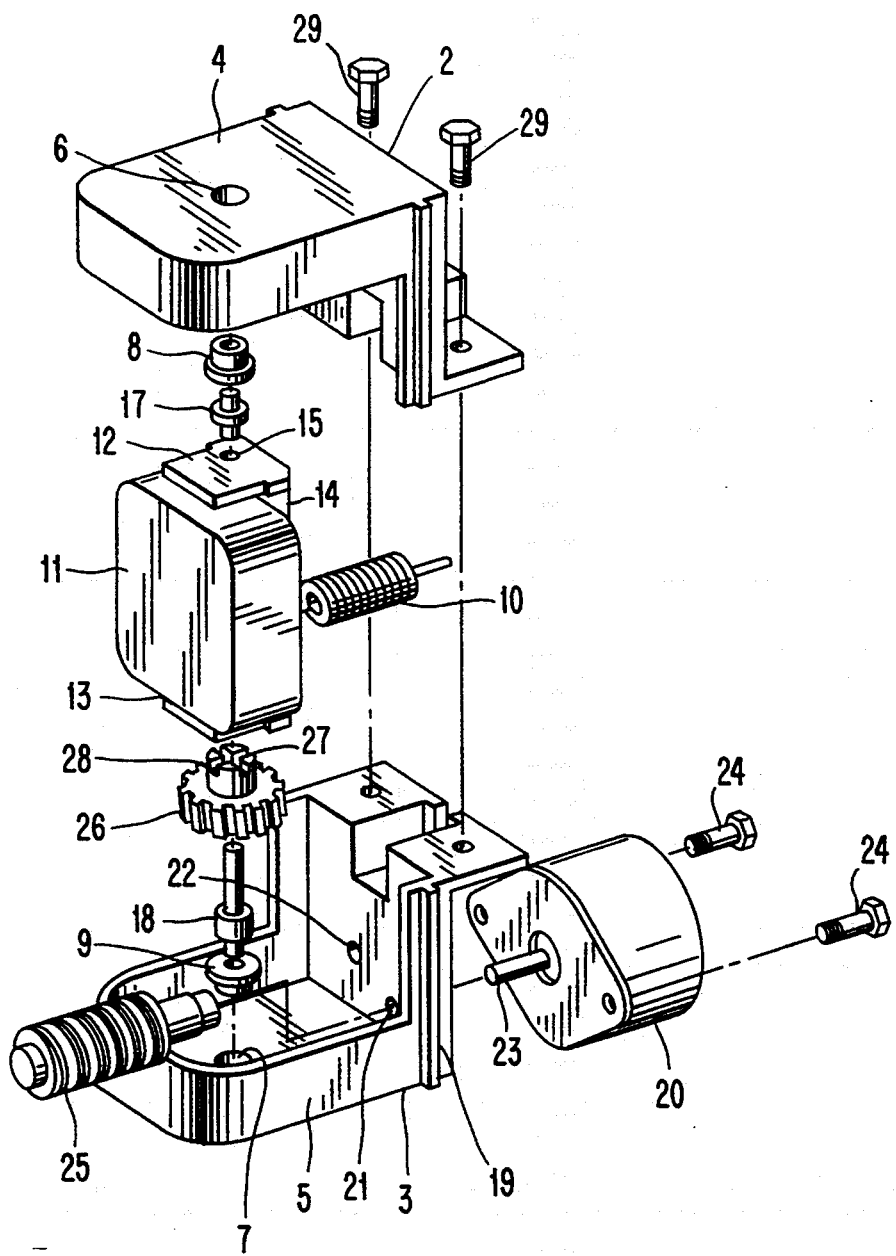
FIG. 3 is an exploded perspective view of the scanning apparatus of FIG. 2.

FIG. 2 is a perspective view of an ultrasonic sensor scanning apparatus in accordance with an embodiment of the present invention, illustrating an assembled condition thereof. FIG. 3 is a perspective view of the ultrasonic sensor scanning apparatus of FIG. 2, illustrating an exploded condition thereof.

In FIG. 2, the reference numeral 1 denotes an assembly constituting the outer construction of the assembled scanning apparatus. The assembly 1 comprises an upper body 2 and a lower body 3 which are provided with a pair of horizontally extending bent end portions 4 and 5 spaced from each other in parallel and facing each other, respectively. At the facing end portions 4 and 5, a pair of holes 6 and 7 are formed, respectively, which are arranged in a line parallel to the longitudinal axis of the assembly 1. A pair of axial bearings 8 and 9 are mounted in the holes 6 and 7, respectively, so as to define a rotation axis of an ultrasonic sensor 11.

The ultrasonic sensor 11 is fixedly mounted to a sensor support die 14 which has upper and lower bent portions 12 and 13. A hole 15 is formed at each of the bent portions 12 and 13. In the holes 15, upper and lower support shafts 17 and 18 are fitted at their one ends, respectively. The other ends of upper and lower support shafts 17 and 18 are fitted in the axial bearings 8 and 9, respectively. With these arrangements, the ultrasonic sensor 11 rotates about the support shafts 17 and 18. The upper and lower bodies 2 and 3 are coupled together by means of fastening members 29 such as screws or bolts and nuts. Sensor interfaces of transmitting and receiving units are connected in common to the ultrasonic sensor 11, by means of a lead 10 extending outwardly from the ultrasonic sensor 11.

Now, an installation of driving means for applying a shift force to the sensor support die 14 carrying the ultrasonic sensor 11 will be described.

A vertical wall 19 is integrally formed with the end portion 5 of lower body 3. The vertical wall 19 is provided with a through hole 21 and a fastening hole 22. Inserted into the through hole 21 is a motor shaft 23 of a stepping motor 20 for applying a shift force to the ultrasonic sensor 11. Inserted into the fastening hole 22 is a fastening screw 24 for fixing the stepping motor 20 to the vertical wall 19. A worm gear 25 which constitutes a part of a gear assembly is coupled to the motor shaft 23 of stepping motor 20. The construction of the gear assembly for transmitting the shift force of stepping motor 20 to the ultrasonic sensor 11 will now be described.

The lower support shaft 18 which is coupled to the lower portion of sensor support die 14 to constitute a rotation shaft is coupled to the lower bent portion 13 of sensor support die 14 via a plane gear 26 which is engaged with the worm gear 25 supported on the motor shaft 23 of stepping motor 20. The plane gear 26 has at one surface thereof a protrusion 28 with a cross groove 27. The bent portion 13 of sensor support die 14 has a cross lug not shown. As the cross groove 27 of plane gear 26 is fitted around the cross lug of sensor support die 14, the sensor support die 14 can rotate without slipping on the lower support shaft 18, when it receives the drive force of the stepping motor 20 via the gear assembly.

As the stepping motor 20 shown in FIG. 2 is driven in the above-mentioned construction, the worm gear 25 mounted on the motor shaft 23 rotates by the drive force of stepping motor 20. The drive force of stepping motor 20 is then transmitted to the plane gear 26 engaged with the worm gear 25. By the rotation of plane gear 26, the sensor support die 14 rotates, which is coupled to the plane gear 26 by means of the protrusion 28.

Figure 5:
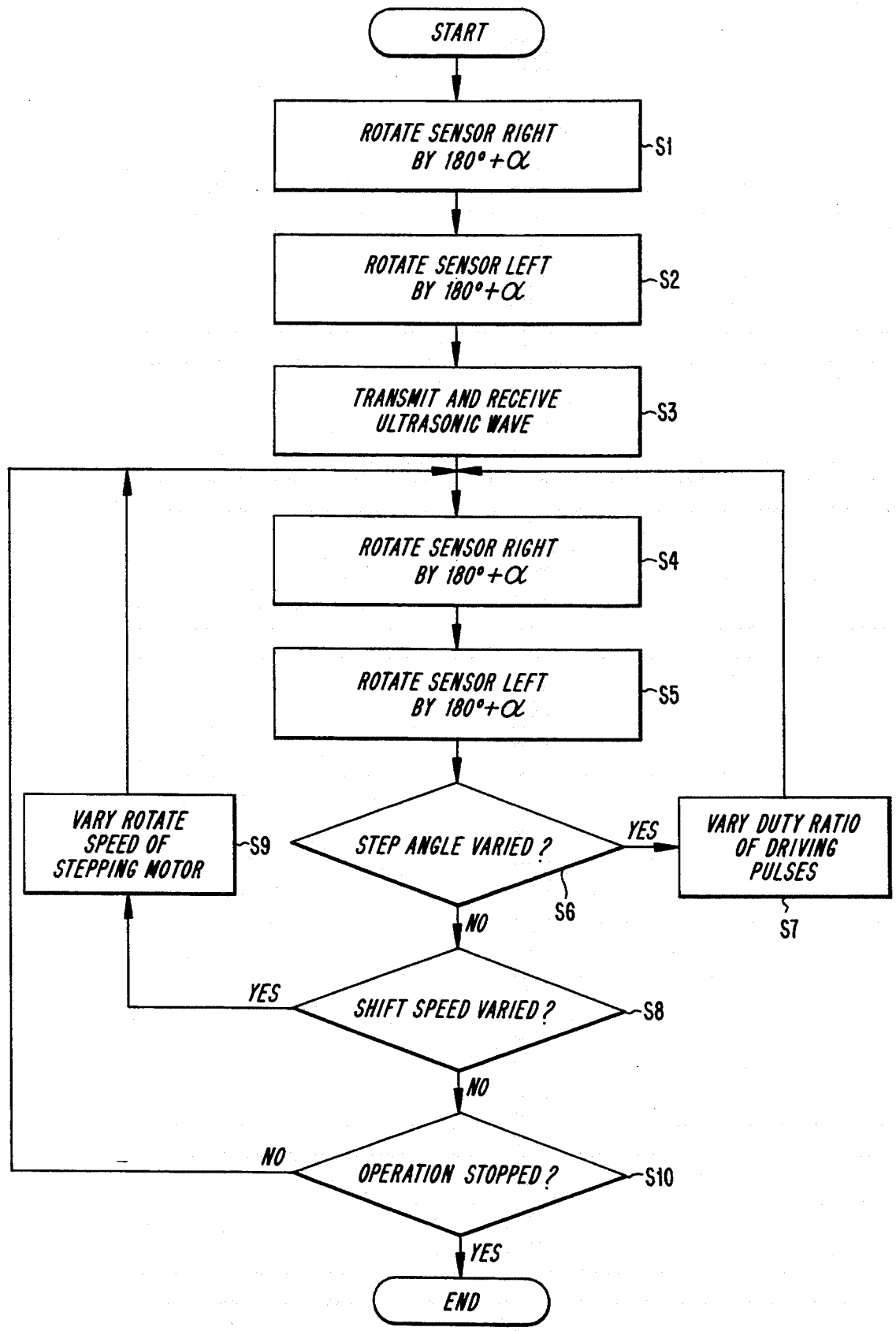
FIG. 5 is a flow chart illustrating an operation of the scanning apparatus according to the present invention.

Accordingly, the ultrasonic sensor 11 fixedly mounted to the sensor support die 14 repeats its operation of radiating ultrasonic wave energy or receiving an echo signal which is a reflected wave, while rotating in a stepped manner over a lateral range of 180° according to the drive force of stepping motor 20, as shown in FIG. 5. By varying the step shift amount and the speed of the stepping motor 20, the ultrasonic sensor 11 can vary in rotation angle or scanning speed.

Now, a procedure of setting the drive position of the ultrasonic sensor in an initial operation will be described.

Figure 4A:
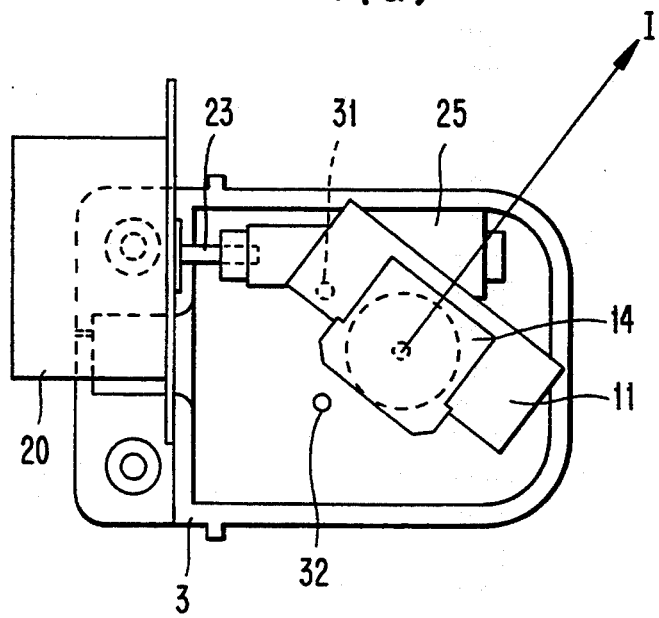
FIGS. 4a to 4d are plan views of the scanning apparatus of the present invention, illustrating the procedures of setting the driving position thereof.

Assuming that the stepping motor 20 rotates in a normal direction or a reverse direction For one cycle, the number of steps corresponding to one cycle corresponds to the amount for shifting the ultrasonic sensor 11 through an angle of 180°. That is, where the ultrasonic sensor 11 rotates 15° at one step of the motor 20, 180° rotation thereof is achieved by stepping operations of 12 times. On the other hand, where the ultrasonic sensor 11 rotates 75° at one step of the motor 20, 180° rotation thereof is achieved by stepping operations of 24 times. If the scanning operation is initiated at an inaccurate position when the ultrasonic sensor 11 operates initially, this error is then required to be corrected. That is, the shift start point where the ultrasonic sensor 11 starts to rotate may be an optional position, as shown in FIG. 4a. In other words, the ultrasonic sensor 11 may be oriented in an optional or random direction as indicated by a phantom line I extending from the center or ultrasonic sensor As means for adjusting the shift of ultrasonic sensor at a point of time when the ultrasonic sensor 11 starts to rotate, a pair of stoppers 31 and 32 are provided at the lower body 3 and adapted to stop the shift of sensor support die 14.

In particular, the first stopper 32 is positioned such that when a horizontal axial line H passing through the center of the scanning apparatus and a vertical axial line V perpendicular to the horizontal axial line H are established, the angle $\alpha$ defined between the phantom line I along which the ultrasonic sensor 11 is oriented and the vertical axial line V corresponds to an angle of, for example, 15° through which the stepping motor 20 drives one step.

Referring to FIG. 5, the stepping motor 20 rotates the ultrasonic sensor 11 through an angle of $180° + \alpha$ a which corresponds to the number of steps obtained by summing one step to the normal scanning angle of the ultrasonic sensor 11, namely, 180°, for one rotation in the right or left direction only, when it drives initially at a step S1 according to a program previously stored in a microcomputer 30, the sensor 11 does not transmit or receive waves during step S1 of FIG. 5.

Figure 4B:
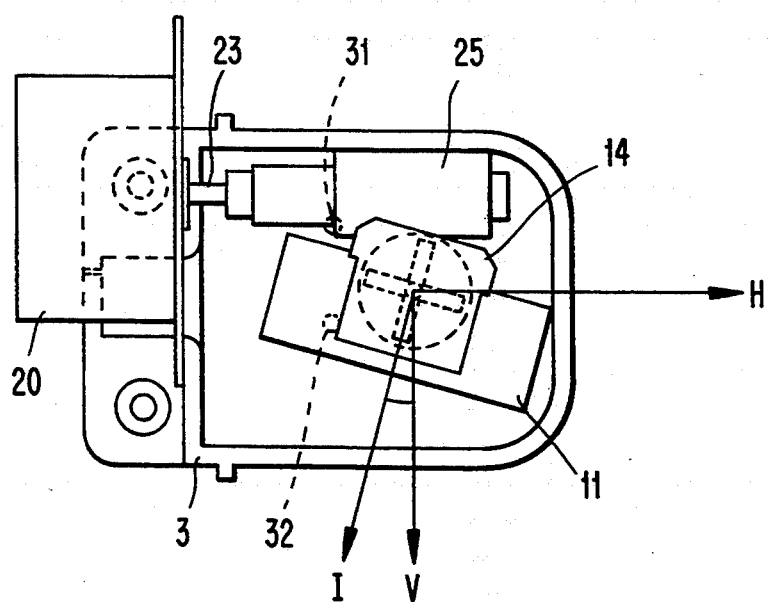

When the ultrasonic sensor 11 is rotated in one direction, for example, the right direction, the sensor support die 14 carrying the ultrasonic sensor 11 comes into contact with the stopper 32 at a certain point of time, as shown in FIG. 4b. Thereafter, the stepping motor 20 further rotates for the remnant of the rotation amount predetermined at the initial operation. However, the sensor support die 14 is shifted no longer due to the stopper 32 and thus maintained at the stopped state.

That is, as the stepping motor 20 rotates normally according to its stepping of one cycle at its initial drive operation, the ultrasonic sensor 11 is shifted in the right direction through an angle of $180° + 1$ step. The shift of ultrasonic sensor 11 is initiated at an optional position, as shown in FIG. 4a. At a certain shift initiation position, the shift range of ultrasonic sensor 11 may be beyond a reference shift range. However, when the ultrasonic sensor 11 reaches the stopper 32, it rotates no longer due to the stopping function of stopper 32, as shown in FIG. 4b. At this time, the stepping motor 20 rotates idly.

Figure 4C:
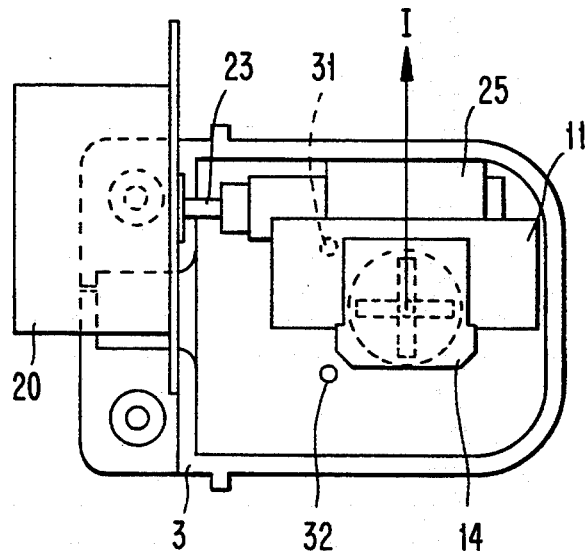
Figure 4D:
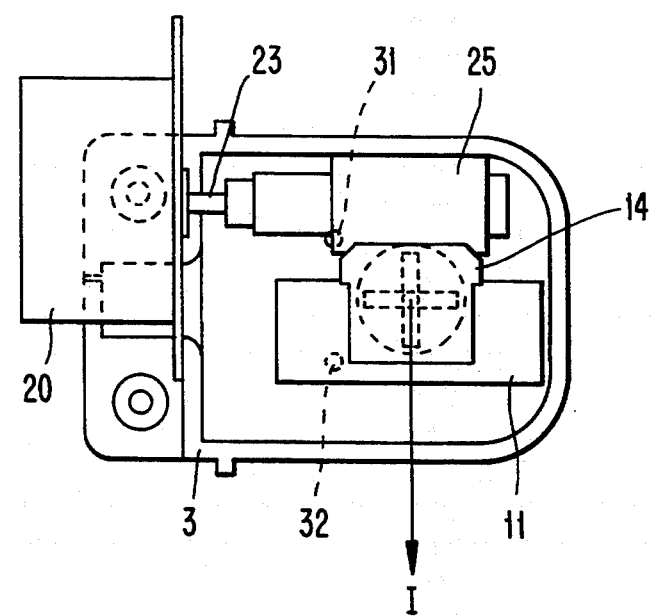

After the idle rotation of stepping motor 20 terminates, the ultrasonic sensor 11 is shifted from the stopper 32, the shift initial point, again in the reverse direction through the angle of $180° + 1$ step, at a step S2. As a result, the ultrasonic sensor 11 reaches a normal scanning initiation point, as shown in FIG. 4c. That is, the ultrasonic sensor 11 comes into contact with the second stopper 31. Now, a scanning operation can be initiated as per step S3 of FIG. 5. At a step S3, the ultrasonic sensor 11 begins to perform its 180° scanning operation while radiating an ultrasonic wave and receiving an echo signal, as shown in FIG. 4d and explained later in connection with FIG. 8. Accordingly, the second stopper 31 may be regarded as a reference setting axis.

On the other hand, the stoppers 31 and 32 are not limited to the illustrated mechanical ones, in accordance with the present invention. They may be substituted by means such as photocouplers or photosensors electrically operated.

After the ultrasonic sensor 11 reaches the normal scanning initiation point, it repeats lateral scanning operations through an angle of just 180° along predetermined paths at steps S4 and S5.

When one step shift of the ultrasonic sensor 11 is desired to be varied at a step S6, the variation is achieved by adjusting the duty ratio of driving pulses applied to the stepping motor 20 in normal and reverse rotations of the stepping motor 20, at a step S7. Where the shift, speed is desired to be varied at a step S8, the variation can be achieved by varying the rotation speed of the stepping motor 20 at a step S9. At a step S10, a discrimination is made about whether the operation is completed. When the operation is not completed yet, the steps S4 to S10 are repeated.

As apparent from the above description, the scanning apparatus according to the present invention has a firm driving mechanism in that the ultrasonic sensor is rotated by the stepping motor and the gear assembly. In particular, the shift range and shift speed of the ultrasonic sensor can be Freely adjusted in that the rotation amount of the stepping motor can be easily adjusted.

Now, a control device For controlling the scanning apparatus will be described.

Figure 6:
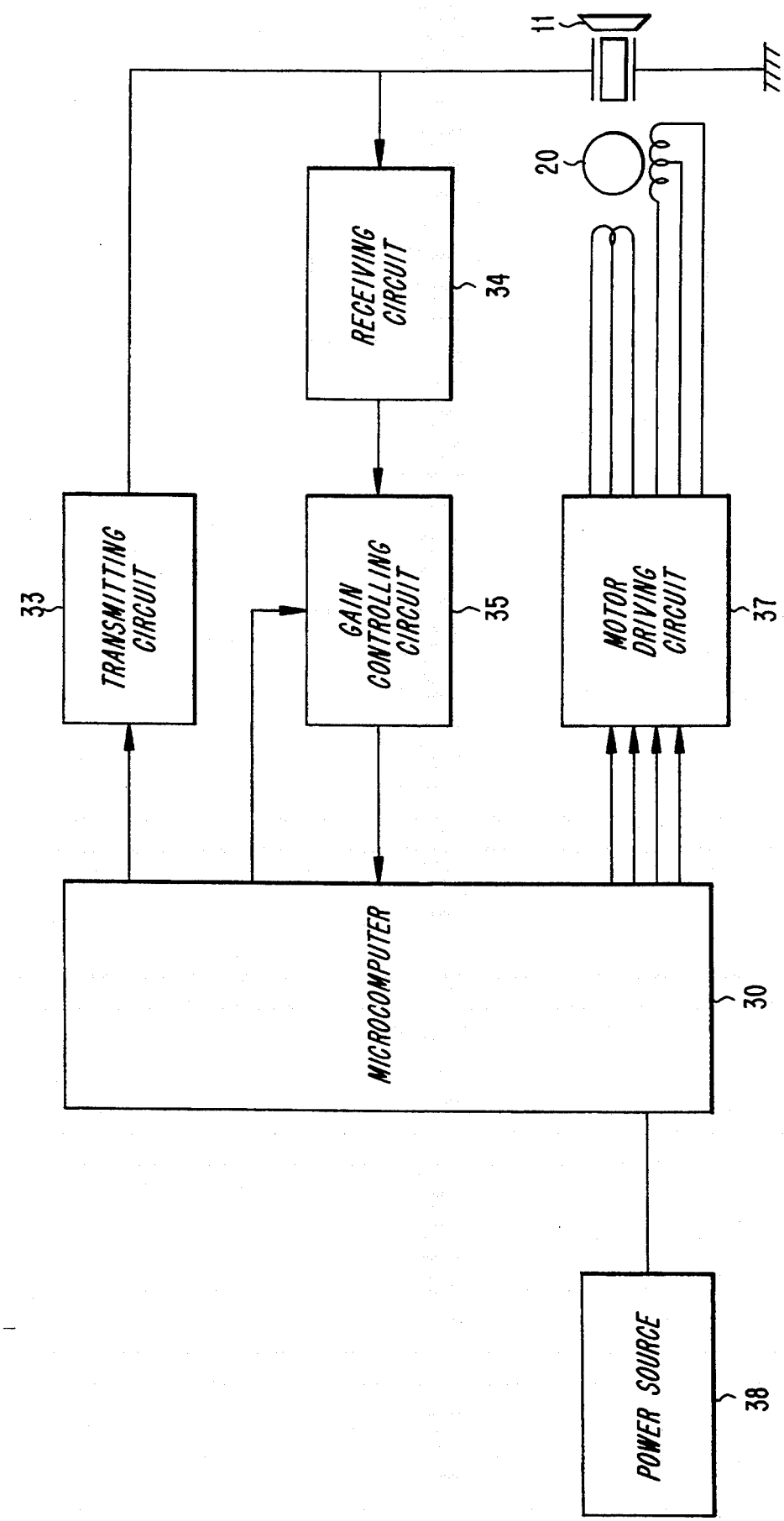
FIG. 6 is a block diagram of a control device for the scanning apparatus according to the present invention.
Figure 7:
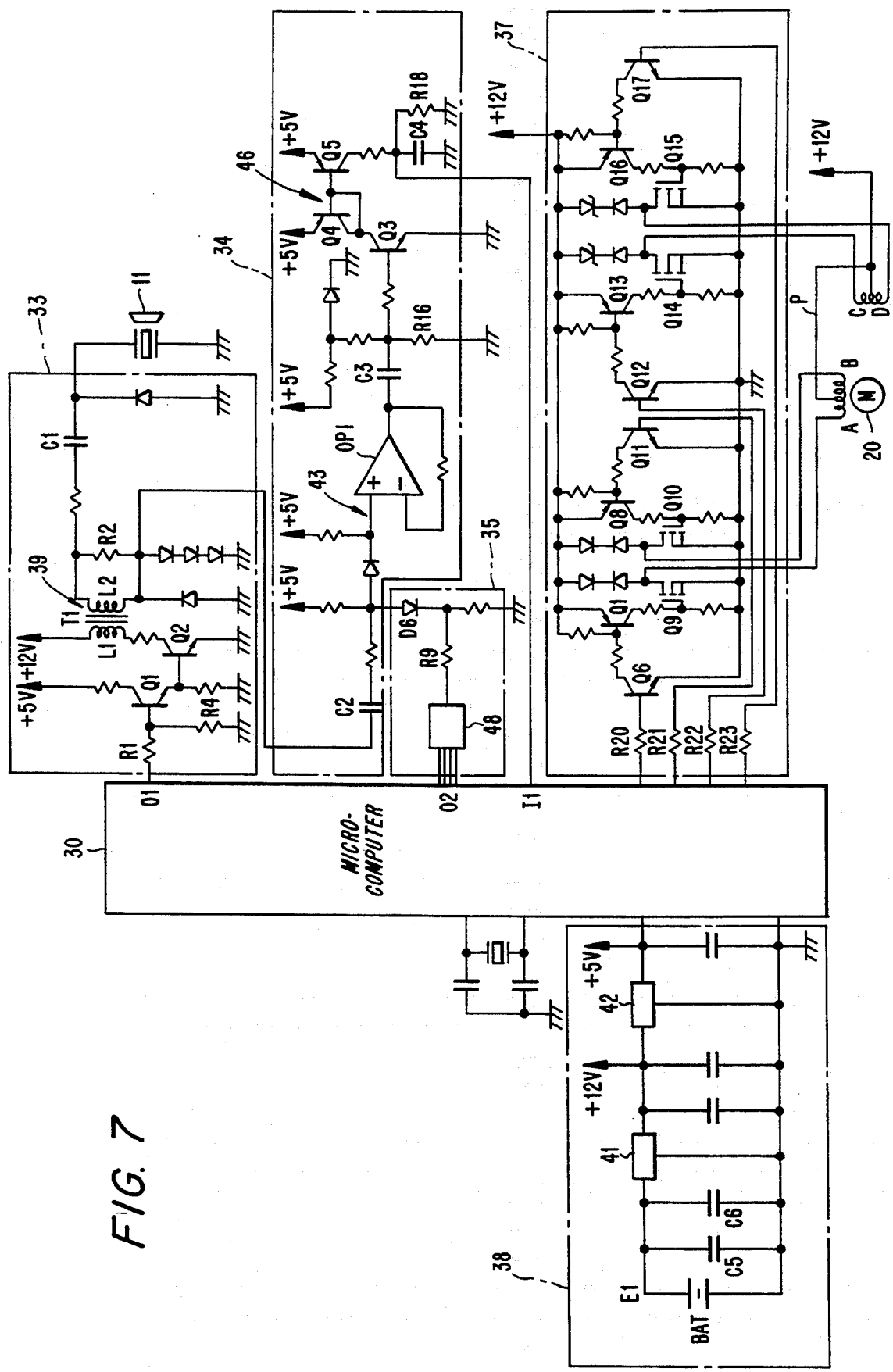
FIG. 7 is a circuit diagram of the control device shown in FIG. 6.

FIG. 6 is a block diagram of the control device according to the present invention. FIG. 7 is a circuit diagram of the control device shown in FIG. 6.

In FIG. 6, the reference numeral 11 denotes the ultrasonic sensor. The ultrasonic sensor 11 is driven by a pulse signal supplied from a transmitting circuit 33 under a control of the microcomputer 30 so that it radiates ultrasonic wave energy at a search area indicated by an envelope in FIG. 9. In accordance with an embodiment of the present invention, the search area envelope is set for a calling period of about 11.3 ms. For the calling period, all objects or targets positioned in the search area reflect ultrasonic wave echo energy effectively. The echo energy is then received by the ultrasonic sensor 11 and converted into an electrical signal in a receiving circuit 34 which, in turn, transmits the electrical signal to the microcomputer 30. Where the signal received in the ultrasonic sensor 11 is the signal reflected from a remote object, its intensity is weak. In this regard, a gain controlling circuit 35 is connected between the receiving circuit 34 and the microcomputer 30, so as to control a gain of a signal outputted from the receiving circuit 34.

The microcomputer 30 serves to analyze the target object by use of signal data received therein and discriminate information such as the property or the position of target object.

Of course, the analysis of echo signals in the microcomputer 30 is dependent on the stepping cycle of the stepping motor 20 and the rotation angle of the ultrasonic sensor 11.

Accordingly, the rotation step of the ultrasonic sensor 11 is varied by varying the duty ratio of phase excitation pulses applied to the stepping motor 20 from a motor driving circuit 37, under a control of the microcomputer 30. Also, the shift speed of the ultrasonic sensor 11 can be adjusted by varying the frequency of the phase excitation pulses.

In accordance with the present invention, there is provided a power source 38. As shown in FIG. 7, the power source 38 includes a battery BAT having a positive terminal connected to both one end of each of voltage stabilizing condensers C5 and C6 connected in parallel and a regulator 41 with a capacity of 12 V. To an output of the regulator 41, another regulator 42 with a capacity of 5 V is connected. Accordingly, supplying of two levels of output voltages are achieved. That is, the voltage of 12 V is supplied to the motor driving circuit 37 and one input of the transmitting circuit 33, whereas the voltage of 5 V is supplied to the other input of the transmitting circuit 33 and the microcomputer 30.

The transmitting circuit 33 and the receiving circuit 34 of the ultrasonic sensor will now be described, in conjunction with FIG. 7.

The transmitting circuit 33 includes a pulse driving circuit 39 which generates a driving pulse in response to a control signal outputted from the microcomputer 30 and sends it to the ultrasonic sensor 11. In the ultrasonic sensor 11, the driving pulse is converted into ultrasonic wave energy.

The pulse driving circuit 39 comprises a voltage-boosting transformer T1 and a transistor Q2 connected in series between the ground and the power source. The transformer T1 outputs a driving pulse with an increased voltage level which is sent from a secondary coil L2 of the transformer T1 to the ultrasonic sensor 11, via a DC cut-off condenser C1 and a resistor R7.

The microcomputer 30 outputs a signal with a frequency of 50 KHz from its output O1. The signal from the microcomputer 30 is sent to the base of a transistor Q1 via a resistor R1, to activate the transistor Q1. As the transistor Q1 is activated, it applies alternating control bias to the base of transistor Q2, via a resistor R4.

Accordingly, the ultrasonic sensor 11 outputs ultrasonic wave energy for the signal transmitting period, by the pulse signals periodically outputted from the microcomputer 30 via the resistor R1. The ultrasonic sensor 11 also receives ultrasonic wave echo signals reflected from objects for the signal receiving period. The echo signals from the ultrasonic sensor 11 are sent to the receiving circuit 34 and then to the microcomputer 30.

That is, each echo signal detected by the ultrasonic sensor 11 is applied to the non-inverting input (+) of an operational amplifier OP1 constituting a low noise amplifier 43 via a resistor R2 and a condenser C2. After the echo signal is improved in gain in the amplifier OP1, it is applied to the base of a transistor Q3 via a condenser C3 and a resistor R16. The condenser C3 and resistor R16 are coupled to the output of the amplifier OP1 and adapted to remove noise from the echo signal.

To the collector of the transistor Q3, a current miPror circuit 48 is coupled, which comprises a pair of transistors Q4 and Q5 connected in common at their bases and serves to output the echo signal stably. Coupled to the output of the current mirror circuit 46 fs a low band-pass filter constituted by a resistor R18 and a condenser C4. The echo signal becomes free of noise in the low band-pass filter and is then Fed to an input I1 of the microcomputer.

A gain controlling circuit 35 is coupled to the receiving circuit 34, to automatically control the gain of the received echo signal from the ultrasonic sensor 11. The gain controlling circuit 35 has a digital/analog converter 48 connected between an output O2 of the microcomputer 30 and the non-inverting input (+) of the operational amplifier OP1 and adapted to control a gain received therein. With this arrangement, the gain of echo signal is automatically controlled such that it is decreased at a short detection range where the intensity of echo signal is strong, whereas it is increased at a long detection range where the intensity of echo signal is weak.

That is, when the microcomputer 32 determines the currently inputted echo signal to have a high intensity, the digital/analog converter 48 serves as a non-feedback element and outputs an analog signal with a level lower than the anode of a diode D6. By the analog signal, the diode D6 is conducted so that the intensity of echo signal is decreased. When the echo signal has a low intensity, the digital/analog converter 48 outputs an OFF voltage at the diode D6 so that the echo signal is fed to the receiving circuit 34, without being attenuated.

The motor driving circuit 37 of the stepping motor 20 will now be described.

In accordance with the present invention, the stepping motor 20 employs a four-phase drive circuit wherein four-phase driving pulses are sequentially outputted via resistors R20 to R23. For example, when a phase signal of high pulses is outputted via the resistors R20 and R22 while the resistors R21 and R23 are maintained at their low level states, a transistor Q6 connected at its base to the resistor R20 is turned on. As the transistor Q6 is turned on, a transistor Q6 coupled at its base to the collector of transistor Q8 and a Field effect transistor Q9 coupled at its gate to the collector of transistor Q7 are sequentially turned on, so that driving current is applied to a 12 V power supply line P connected to an intermediate tab of a stator of the stepping motor 20. As a result, an A-phase coil constituting the stator of stepping motor 20 is conducted.

A transistor Q12 is coupled at its base to the resistor R22 and is turned on by a driving pulse outputted via the resistor R22. As the transistor Q12 is turned on, a transistor Q13 coupled at its base to the collector of transistor Q12 and a field effect transistor Q14 coupled at its gate to the collector of transistor Q13 are sequentially turned on, so that a C-phase coil of the stepping motor 20 is conducted. When the A-phase and C-phase coils of the stepping motor 20 constitute a conducted circuit as mentioned above, the stepping motor 20 rotates in anticlockwise.

On the other hand, when a phrase signal of high pulses is outputted via the resistors R21 and R23 while the resistors R20 and R22 are maintained at their low level states, a transistor Q11 connected at its base to the resistor R21 is turned on. As the transistor Q11 is turned on, a transistor Q8 coupled at its base to the collector of transistor Q11 and a field effect transistor Q10 coupled at its gate to the collector of transistor Q8 are sequentially turned on, so that a B-phase coil constituting the stator of stepping motor 20 is conducted.

A transistor Q17 is coupled at its base to the resistor R23 and is turned on by a driving pulse outputted via the resistor R23. As the transistor Q17 is turned on, a transistor Q16 coupled at its base to the collector of transistor Q17 and a field effect transistor Q15 coupled at its gate to the collector of transistor Q16 are sequentially turned on, so that a D-phase coil of the stepping motor 20 is conducted.

When the B-phase and D-phase coils of the stepping motor 20 constitute a conducted circuit as mentioned above, the stepping motor 20 rotates in clockwise. Thus, the stepping motor 20 rotates in clockwise at the conducted states of the B-phase and D-phase coils and in anticlockwise at the conducted states of the A-phase and C-phase coils. Accordingly, the stepping motor 20 rotates normally and reversely, by the above-mentioned arrangement.

On the other hand, the rotation angle of the stepping motor 20 can be adjusted by varying the duty ratio of four-phase driving pulses outputted via the resistors R20 to R23. When the duty ratio is varied from 0.5 to 0.25, assuming that the rotation angle is 15° at the duty ratio of 0.5, the rotation angle becomes 7.5°. At this time, when the frequency of the drive signal increases in double, the ultrasonic sensor 20 shifts 7.5° at the same scanning speed.

Figure 8:
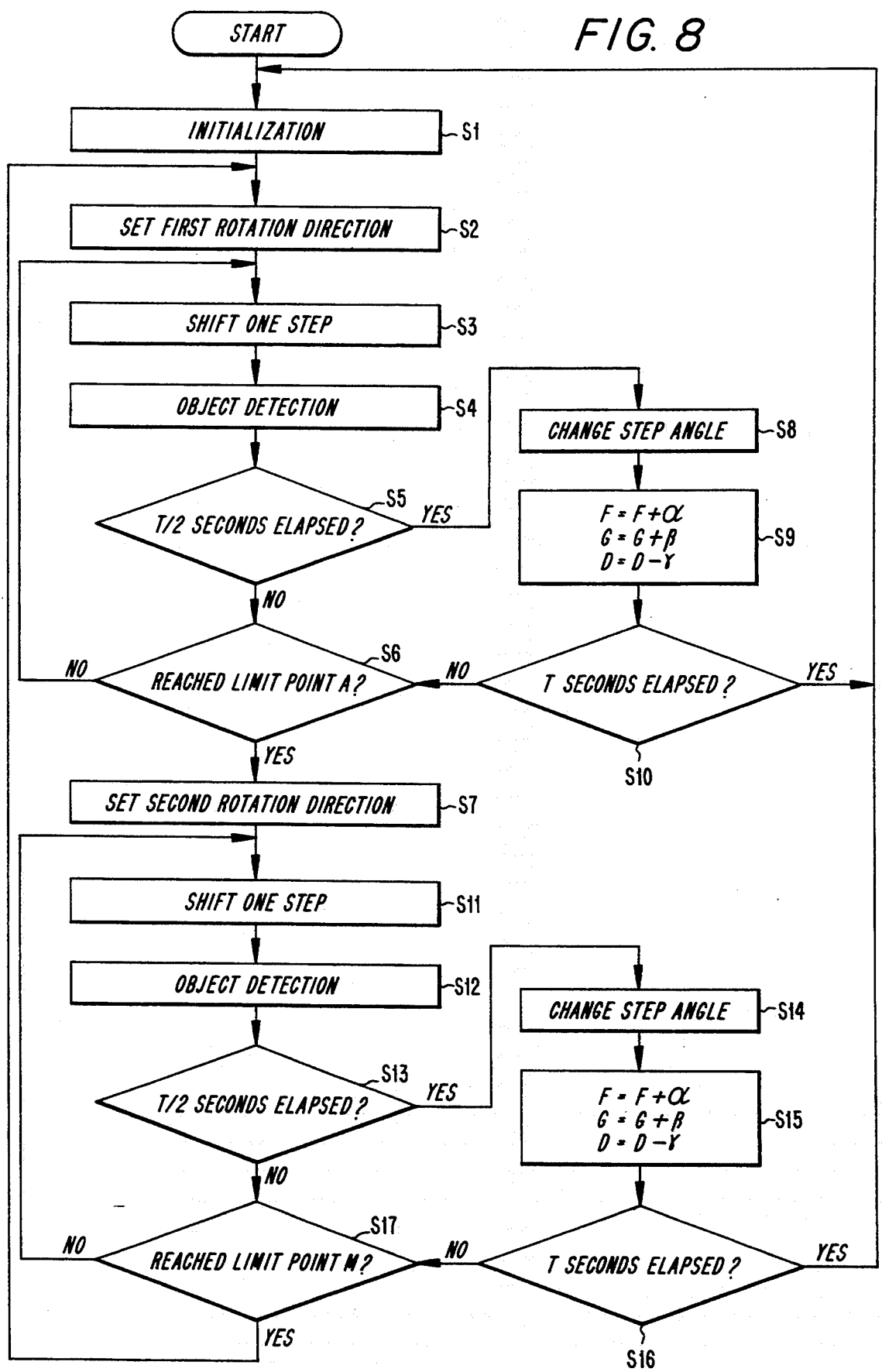
FIG. 8 is a flow chart illustrating an object detection operation carried out by use of the ultrasonic sensor according to the present invention.

Now, an object detection operation of the scanning apparatus according to the present invention will be described, in conjunction with the flow chart of FIG. 8.

The microcomputer 30 is equipped with a ROM (not shown) which has stored operating data of the ultrasonic sensor 11 such as data about the motor step angle of 15°, the receiving gain G of 20 dB, the transmitting Frequency F of 50 KHz and the duty ratio of 0.5 therein. The data stored in the ROM is limited to the numerical values mentioned above and may be varied depending on the purpose of the scanning apparatus.

When supplying of electric power from the power source 38 is started, an initialization of the microcomputer 30 is carried out by a reset signal applied from reset means not shown, at a step S1. That is, the operation of scanning apparatus is initiated, based on the operating data stored in the ROM.

At a step S2, the first rotation direction of the ultrasonic sensor 11 is determined. In the following description, the first rotation direction will be described as, for example, the clockwise direction.

Thereafter, the ultrasonic sensor 11 shifts one step by virtue of the driving of motor 20, at a step S3. Since the shift at this time corresponds to the shift just after the initialization, its shift angle becomes the valise previously set, namely, 15°.

After the rotation of ultrasonic sensor 11, the microcomputer 30 performs the object detection operation at a step S1. That is, the microcomputer 30 sends a driving pulse signal to the transmitting circuit 33, so that the ultrasonic sensor 11 receives the voltage-boosted pulse signal from the transmitting circuit 34 and radiates ultrasonic wave according to the received signal An echo signal reflected from objects is received in the receiving circuit 34 including a wave shaping circuit, via the ultrasonic sensor 11 for a receiving period. The microcomputer 30 receives and analyzes the wave-shaped echo signal. That is, the microcomputer 30 processes data about the detected object such as the direction along which the object is arranged and the distance to the object.

At a step S5, the microcomputer 30 then determines the detection range of the ultrasonic sensor 11. That is, the microcomputer 30 defines the detection range as the short range when it is within a reference detection range corresponding to ½ of the maximum detection range of the ultrasonic sensor 11 and as the long range when it is beyond the reference detection range. Accordingly, the microcomputer 30 discriminates what detection range corresponds to the current detection range.

This discrimination is achieved by carrying out a counting of time from the initialization point and thus discriminating whether the time corresponding to ½ of a predetermined time has elapsed.

Assuming that the predetermined time stored in a memory (not shown) equipped in the microcomputer 30 is T seconds, the microcomputer 30 regards the detection range of ultrasonic sensor 11 as the short range being within ½ of the maximum detection range before T/2 seconds elapses since the initialization. In order to effectively detect objects arranged within the short range, the microcomputer 30 operates the ultrasonic sensor 11, based on the operating data initialized in the step S1.

On the other hand, the microcomputer 30 regards the detection range of ultrasonic sensor 11 as the long range being beyond ½ of the maximum detection range after T/2 seconds elapses since the initialization. In order to effectively detect objects arranged within the long range, the microcomputer 30 increments the operating data by a predetermined value and carries out the detection operation, based on the varied operating data. This will be described here inafter.

If No as a result of the discrimination at the step S5, that is, when ½ of the predetermined time T has not elapsed, the ultrasonic sensor 11 maintains the initially set step angle, namely, 15°. Then, a step S6 is executed. At the step S6, a discrimination is made about whether the ultrasonic sensor 11 has reached the clockwise shift limit point A.

In accordance with the present invention, the scanning apparatus shifts right and left the ultrasonic sensor 11 through an angle of 90° in each direction, namely, in the total range of 180° in an alternating manner when viewed in front. When the ultrasonic sensor 11 reaches the right end position, namely, the clockwise maximum shift point A, the shift direction of ultrasonic sensor 11 is reversed to the second rotation direction, namely, the anticlockwise direction, at a step S7.

On the other hand, when it is discriminated that the ultrasonic sensor 11 has not reached the clockwise maximum shift point A yet, the microcomputer 30 repeats the operations following the step S3. That is, the ultrasonic sensor 11 rotates through the step angel of 15° set at the initialization step, at the step S3. At the step S4, the ultrasonic sensor 11 radiates ultrasonic wave to perform the object detection, at the step S4.

When it is determined at the step S5 that ½ of the predetermined time T has elapsed, the microcomputer 30 changes the rotation angle of ultrasonic sensor 11 from 15° to 7.5° according to the program stored there in, at a step S8. Accordingly, it is possible to effectively detect the object indicated by the shaded area in FIG. 9. That is, the rotation angle of ultrasonic sensor 11 is subdivided, so as to accurately detect objects positioned in the long range being beyond ½ of the maximum detection range of the ultrasonic sensor 11. Thereafter, the microcomputer 30 increments the transmitting frequency F by the predetermined increment $\alpha$ and the receiving gain G by the predetermined increment $\beta$ according to the sensed long detection range at a step S9, so as to increase the gain of received echo signal.

In the long detection range, it is necessary to lengthen the set time for receiving the echo signal reflected from an object, correspondingly to the lengthened detection range. To this end, the time for transmitting ultrasonic wave in one transmitting and receiving cycle is reduced, whereas the receiving time is lengthened. That is, the duty ratio D of the transmitting time in one transmitting and receiving cycle is decreased by the decrement $\gamma$.

At a step S10, the microcomputer 30 discriminates whether The predetermined time T has elapsed. If No, the procedure returns to the step S6 so that the microcomputer 30 repeats the operations following the step S6. The microcomputer 30 discriminates the position of ultrasonic sensor 11 at the step S6. When the microcomputer 30 discriminates that the ultrasonic sensor 11 has reached the point A, it rotates the ultrasonic sensor 11 in anticlockwise at the step S7. However, when the ultrasonic sensor 11 has not reached the point A yet, the microcomputer 30 rotates the ultrasonic sensor 11 through the one step angle changed at the step S8, namely, 7.5°.

Where the procedure returns to the step S3 as mentioned above, the operations of steps S4, S5, S8 and S9 are sequentially executed. At a step S10, a discrimination is then made about whether the predetermined time T has elapsed. When the predetermined time T has not elapsed yet, the operations following the step S6 are repeated. In particular, the transmitting frequency F and the receiving gain G are incremented by the predetermined increments α and β, respectively, at the step S9, every time when the operations are repeated. Also, the duty ratio is decreased by the decrement γ, correspondingly to the increase in receiving time. Thus, it is possible to lengthen the detection range efficiently in a gradual manner.

On the other hand, when the ultrasonic sensor 11 reaches its maximum shift position, namely, at the predetermined time T, the microcomputer 30 is initialized again at the step S1 and repetitively controls the operations following the step S1, based on the data initialized at the step S1.

Where the anticlockwise direction of ultrasonic sensor 11 has been set at the step S7 and one step shift of ultrasonic sensor 11 is made at the step S11 as the discrimination at the step S6 has been made as Yes, the shift amount becomes 7.5° when the shift angle has been readjusted at the step S8. If not, the shift amount becomes 15° which has been set at the step S1. Thereafter, the microcomputer 30 detects objects in the same manner as the step S4, at a step S12, and discriminates at a step S13 whether ½ of the predetermined time T has elapsed. If Yes at the step S13, the step angle of ultrasonic sensor 11 is changed from 15° to 7.5° at a step S14. However, where the step angle has already been changed at the step S8, the changed step angle of 7.5° is maintained without any readjustment.

At a step S15, the transmitting frequency F and the receiving gain G are incremented in the same manner as the step S9. Also, the duty ratio of the transmitting time is decreased, taking into consideration the time taken for ultrasonic wave to strike on an object positioned in the long detection range and reflect from the object.

In other words, the transmitting frequency F and the receiving gain G are incremented by the predetermined increments α and β, respectively, at a step S16, every time when the operations are repeated until the predetermined time T elapses. Also, the duty ratio is gradually decreased by the decrement γ. Thus, it is possible to detect more accurately objects positioned in the long range.

On the other hand, when it is determined at the step S16 that the predetermined time T has elapsed, the procedure returns to the step S1 so that the operations following the step S1 are repeated. If No at the step S16, a discrimination is made about the position of ultrasonic sensor 11 at a step S17. When the microcomputer 30 discriminates that the ultrasonic sensor 11 has not reached the maximum anticlockwise shift point M yet, the procedure returns to the step S11 so that the operations following the step S11 are repeated. However, when the microcomputer 30 discriminates that the ultrasonic sensor 11 has reached the maximum anticlockwise shift point M, the procedure returns to the step S2 so that the rotation direction of ultrasonic sensor 11 is changed to the clockwise direction and the operations following the step S2 are repeated.

As apparent from the above description, in accordance with the object detection method according to the present invention, it is possible to improve the object detection efficiency, by increasing the transmitting frequency and the receiving gain, every time when the detection range is changed from the short range to the long range. As the shift angle of ultrasonic sensor is subdivided when the ultrasonic sensor senses the increase of the detection range, in accordance with the present invention, an accurate object detection can be achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a method for detecting objects by a rotatable ultrasonic sensor, comprising the steps of:
  A) rotating said ultrasonic sensor in a first direction by incremental angles;
  B) changing the length of said incremental angles after a predetermined time has elapsed following the initiation of step A, and
  C) actuating said ultrasonic sensor to perform an object detection operation during steps A and B.

2. A method according to claim 1 further including the steps of:
  D) reversing the direction of rotation of said ultrasonic sensor to a second direction after said ultrasonic sensor reaches a first preselected point while rotating in said first direction, rotation in said second direction being performed by incremental angles;
  E) changing the length of said incremental angles of step D after a predetermined time has elapsed following the initiation of step D; and
  F) actuating said ultrasonic sensor to perform an object detection operation during steps D and E.

3. A method according to claim 2 further including the step of:
  G) repeating steps A–F when said ultrasonic sensor reaches a second preselected point while rotating in said second direction.

4. A method according to claim 2, wherein each of steps B and E comprises shortening said length.

5. A method according to claim 4, wherein said predetermined time of step B equals said predetermined time of step E.

6. A method according to claim 2, wherein steps A, B, D and E comprise rotating said ultrasonic sensor by a motor which receives driving pulses from a source of driving pulses, said changing of the length of incremental angles of steps B and E comprising varying a duty ratio of such pulses.

7. A method according to claim 6, wherein said varying of said duty ratio of pulses comprises reducing said duty ratio.

* * * * *